(12) United States Patent
Kubota et al.

(10) Patent No.: US 6,955,857 B2
(45) Date of Patent: Oct. 18, 2005

(54) EXCHANGE DECOUPLED COBALT/NOBLE METAL PERPENDICULAR RECORDING MEDIA

(75) Inventors: Yukiko Kubota, Pittsburgh, PA (US); Dieter Weller, Gibsonia, PA (US); Mei-Ling Wu, Cranberry Township, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 98 days.

(21) Appl. No.: 10/032,721

(22) Filed: Dec. 27, 2001

(65) Prior Publication Data

US 2002/0086184 A1 Jul. 4, 2002

Related U.S. Application Data

(60) Provisional application No. 60/258,790, filed on Dec. 29, 2000.

(51) Int. Cl.[7] .............................................. G11B 5/673
(52) U.S. Cl. .......................... 428/694 TS; 428/694 TM
(58) Field of Search .................... 428/694 TS, 694 TM, 428/611, 669, 670, 678, 215, 336

(56) References Cited

U.S. PATENT DOCUMENTS

| | | | |
|---|---|---|---|
| 4,103,315 A | | 7/1978 | Hempstead et al. |
| 4,210,946 A | | 7/1980 | Iwasaki et al. |
| 5,051,288 A | | 9/1991 | Ahlert et al. |
| 5,587,235 A | * | 12/1996 | Suzuki et al. ................ 428/332 |
| 5,604,030 A | * | 2/1997 | Yamane et al. .............. 428/332 |
| 5,726,838 A | * | 3/1998 | Soeya et al. ........... 360/327.32 |
| 5,750,270 A | * | 5/1998 | Tang et al. .................. 428/611 |
| 5,834,085 A | | 11/1998 | Lairson et al. |
| 6,139,950 A | | 10/2000 | Wu et al. |
| 6,156,422 A | | 12/2000 | Wu et al. |
| 6,207,269 B1 | | 3/2001 | Wu et al. |
| 6,212,047 B1 | | 4/2001 | Payne et al. |
| 6,218,003 B1 | | 4/2001 | Wu et al. |
| 6,221,481 B1 | | 4/2001 | Wu et al. |
| 6,238,780 B1 | | 5/2001 | Wu et al. |
| 6,238,809 B1 | | 5/2001 | Wu et al. |
| 6,280,813 B1 | | 8/2001 | Carey et al. |
| 6,468,670 B1 | * | 10/2002 | Ikeda et al. ................. 428/611 |
| 2001/0051287 A1 | * | 12/2001 | Kikitsu et al. ........ 428/694 ML |
| 2002/0192506 A1 | * | 12/2002 | Coffey et al. ......... 428/694 TM |

OTHER PUBLICATIONS

L. Wu et al., "Medium noise properties of Co/Pd multilayer films for perpendicular magnetic recording", *Journal of Magnetism and Magnetic Materials 193*; (1999) pp. 89–92; Publisher—Elsevier; JAPAN.

Y. Ochiai et al.; "Co/Pt and Co/Pd Ultrathin Multilayered Films as New Magneto–Optical Recording Materials"; *IEEE Transactions on Magnetics*, vol. 25, No. 5. p. 3755–3757; Sep. 1989; JAPAN.

P.F. Carcia; "Perpendicular magnetic anisotropy in Pd/Co and Pt/Co thin–film layered structures" *Journal of Applied Physics*, vol. 63, No. 10, p. 5066–5073, May 15, 1988; American Institute of Physics.

Takano et al.; "$Co_{1-x}Cr_x$/Pt multilayers as perpendicular recording media" *Journal of Applied Physics*, vol. 87, No. 9, p. 6364–6366, May 1, 2000, American Institute of Physics.

* cited by examiner

*Primary Examiner*—Kevin M. Bernatz
(74) *Attorney, Agent, or Firm*—Buchanan Ingersoll PC; Dennis M. Carleton

(57) ABSTRACT

A magnetic recording medium of the perpendicular type, for a disc drive. The magnetic recording material includes a Cobalt alloy layer interspersed with a noble metal layer. The initial graded material is paramagnetic to increase to the magnetic properties of perpendicular recording media into increase the signal to noise ratio. The final recording layer has 8–20 alternating multilayer of the Cobalt alloy and a noble metal.

26 Claims, 2 Drawing Sheets

EXCHANGE DECOUPLED COBALT/NOBLE METAL PERPENDICULAR RECORDING MEDIA

This application is based on provisional patent application Ser. No. 60/258,790, filed Dec. 29, 2000.

BACKGROUND OF THE INVENTION

1. Field of the Invention

The present invention generally relates to magnetic recording media such as for a computer disc drive, and more particularly to an exchange decoupled Cobalt/noble metal perpendicular recording medium.

2. Background of the Invention

Most modern information storage systems depend on magnetic recording due to its reliability, low cost, and high storage capacity. The primary elements of a magnetic recording system are the recording medium and the read/write head. Magnetic discs with magnetizable media are used for data storage in almost all computer systems. Various modeling and simulations have suggested that perpendicular recording (in which the medium is magnetized with a direction perpendicular to the surface of the disc, that is, in the direction of thickness thereof) is superior to conventional longitudinal recording due to various reasons, including larger optimal medium thickness, better write field efficiency, less demagnetizing fields from the stored bit pattern, etc. As the longitudinal magnetic recording technology reaches its limit in the areal density due to the lower thermal stability, perpendicular magnetic recording possesses the potential to a higher recording density. The larger perpendicular anisotropy and high remanence squareness of the Co(X)/noble metal (X=B, Cr, and etc.) multilayers suggest that these thin films are promising candidates for perpendicular magnetic recording. Doping nonmagnetic materials such as Chromium (Cr) or Boron (B) into a Cobalt (Co) layer for the Co(X)/noble metal multilayers can reduce intergranular exchange coupling and result in lower medium noise. However, the earlier studies of CoB/Pd multilayers showed that the initial CoB layers were continuous. Therefore, it could provide a source for transition media noise, resulting in lower signal-to-noise recording.

It is therefore an object of the present invention to provide a magnetic recording material for a perpendicular recording medium having improved intergranular exchange decoupling.

It is a further object of the present invention to provide a perpendicular magnetic recording medium having lower medium noise and resultant higher signal to noise recording.

It is a still further object of the present invention to provide a graded Cobalt/noble metal bilayer perpendicular recording material having alternating layers of a Cobalt alloy and a noble metal.

SUMMARY OF INVENTION

The above and other objects, features and advantages of the present invention are attained by a magnetic recording medium having a substrate, a magnetic interlayer and a layer of magnetic recording material thereon, the magnetic recording material comprising a plurality of bilayers having a Cobalt alloy and a noble metal.

In an alternate embodiment, the magnetic recording medium comprises a substrate, a soft magnetic underlayer, a paramagnetic layer and a perpendicular recording material including alternating layers of a Cobalt alloy and a noble metal.

In a further embodiment, the magnetic recording medium comprises a substrate, a soft magnetic underlayer, and a graded magnetic recording material including alternating layers of a Cobalt alloy and a noble metal.

The initial growth region is graded, such that this initial film is paramagnetic at room temperature and does not exchange link neighboring grains. Ideally, the graded region has identical structure to the subsequent magnetic multilayer. This could be accomplished by changing the magnetic alloy CoX such that this alloy by itself becomes paramagnetic, e.g., $CoCr_{40}$. Another implementation of this idea is to drop the thickness of the CoX layer low enough, so that the ferromagnetic Curie temperature of this (CoX/Pd)x N multilayer drops below room temperature, thereby also rendering this initial region paramagnetic.

BRIEF DESCRIPTION OF THE DRAWINGS

Various other objects, features and advantages of the present invention will become readily apparent by reading the following description in conjunction with the drawings, which are shown by way of example only, wherein.

DESCRIPTION OF THE PREFERRED EMBODIMENTS

Figure 1:
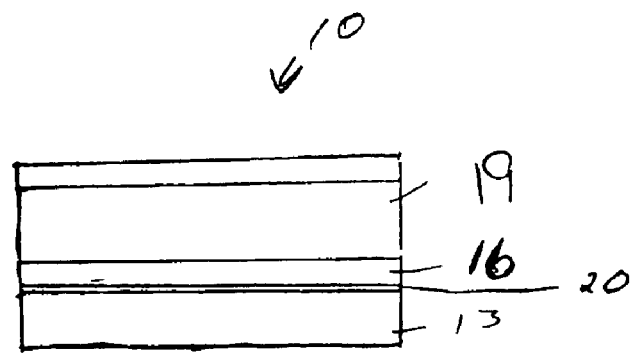
FIG. 1 is a cross-sectional diagram of a perpendicular magnetic recording material manufactured according to the present invention.

Referring now to the drawings in detail there is shown in FIG. 1 a cross-sectional representation of a magnetic recording medium 10 manufactured according to the present invention. A perpendicular magnetic recording medium such as a computer disc, comprises a substrate 13 upon which is deposited a soft magnetic underlayer 16 and then the graded Cobalt/noble metal perpendicular recording material 19 of the present invention. If desired, a 2–5 nm thick adhesion layer or magnetic interlayer 20 may be provided between the substrate 13 and the soft magnetic underlayer 16, which adhesion layer may comprise tantalum. The soft magnetic underlayer 16 may comprise a laminated radially textured soft magnetic underlayer manufactured according to the teaching of applicant's co-pending application Ser. No. 10/003,363 filed on Nov. 15, 2001, which application is assigned to the present assignee herein, and is hereby incorporated by reference herein in its entirety. By way of brief explanation the soft magnetic underlayer 16 comprises an amorphous iron-Cobalt-boron alloy layer with tantalum layer applied to a total thickness of about 240 nm. The soft magnetic underlayers are applied by sputtering techniques, which are well known to those skilled in the art.

Figure 2:
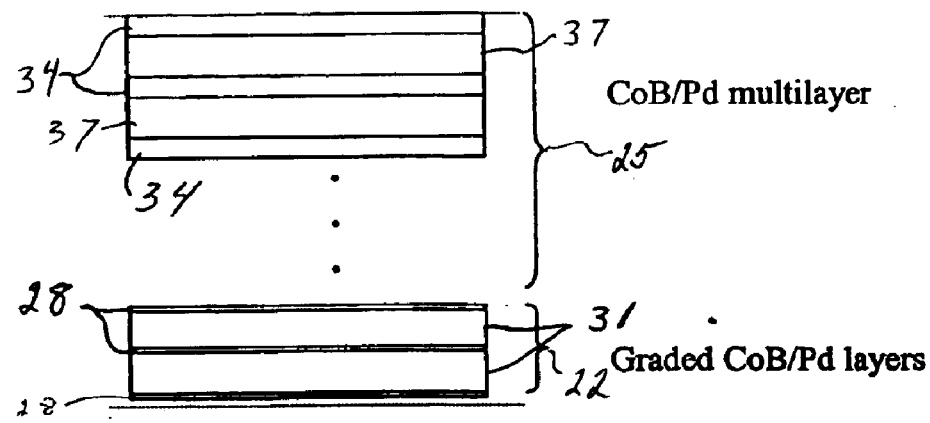
FIG. 2 shows a schematic cross-sectional representation of the graded magnetic recording material layers according to the present invention.
Figure 5:
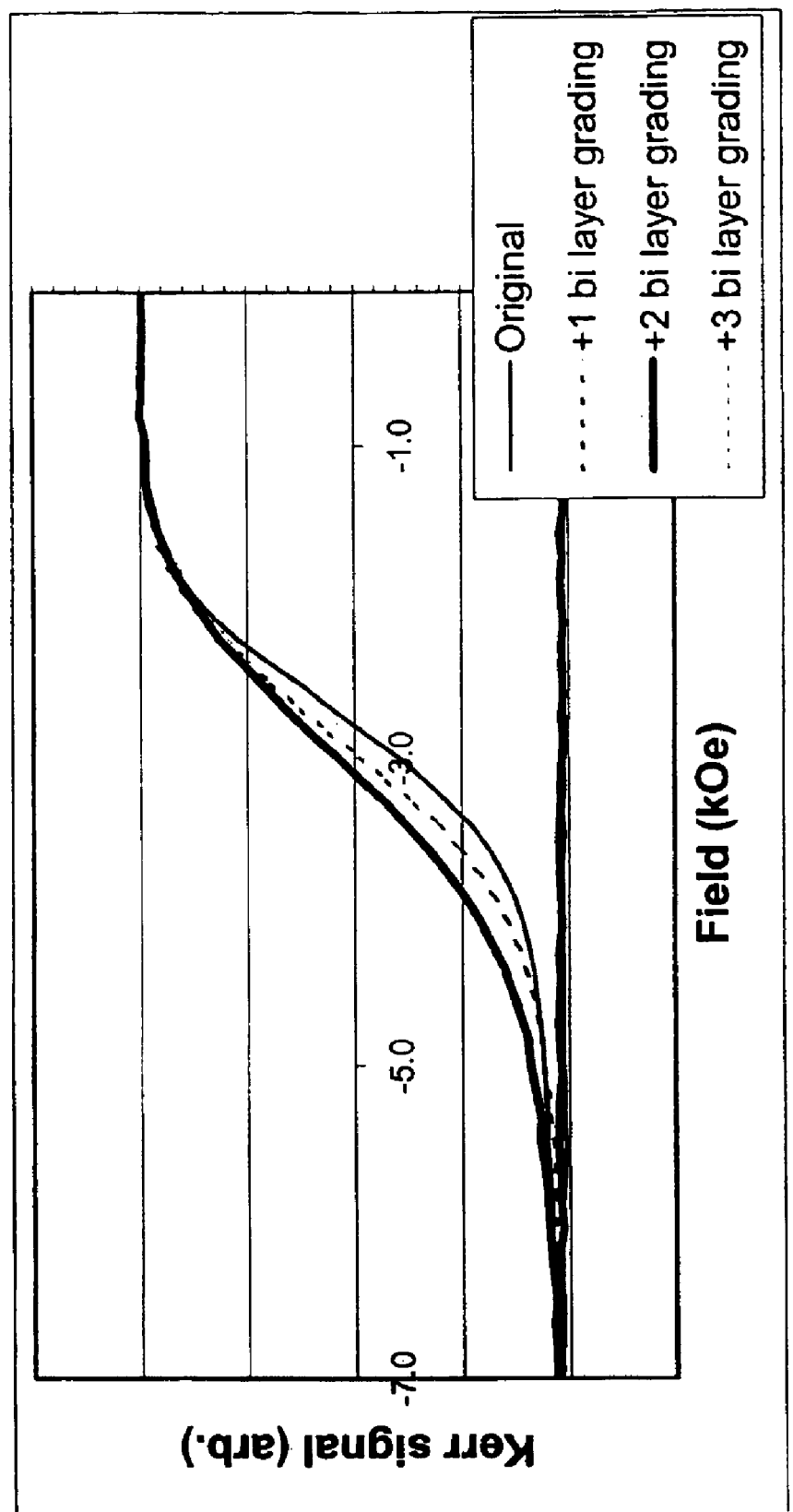
Figure 1:
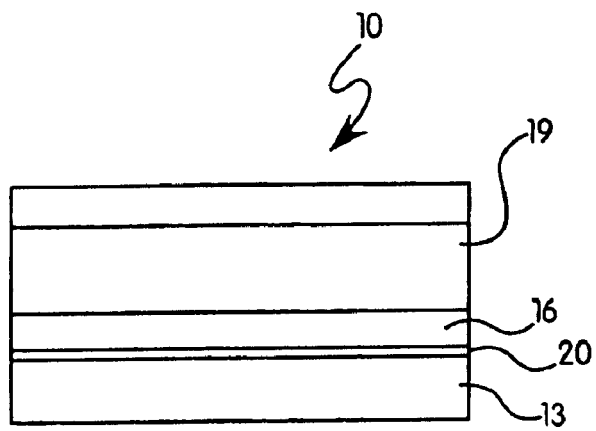
Figure 2:
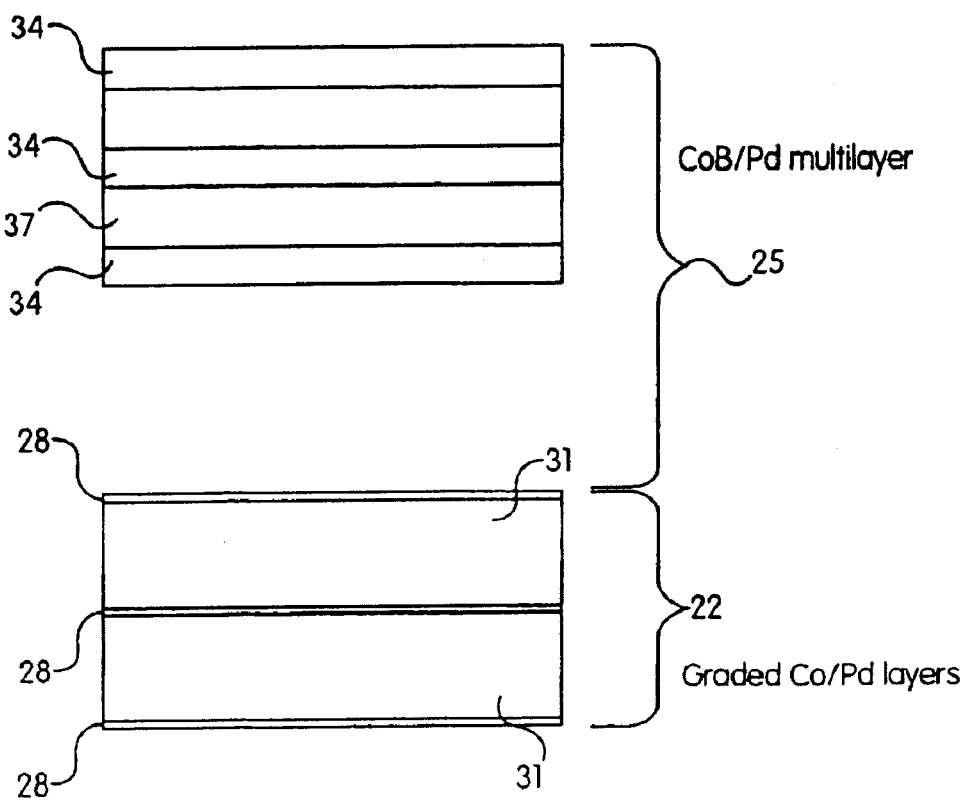

The perpendicular magnetic recording material preferably comprises a Cobalt alloy (Co(X)) having alternate layers of a noble metal. The Cobalt is alloyed with one or more of the group comprising boron (B), chromium (Cr), Tantalum (Ta), Francium (Fr), Platinum (Pt), Tungsten (W), Manganese (Mn), Molybdenum (Mo), Ruthenium (Ru), Silicon (Si), Nickel (Ni), Copper (Cu), or Gold (Ag), whereas the noble metal preferably comprises palladium (Pd) or platinum (Pt). In an alternate embodiment, the perpendicular magnetic material comprises graded bilayers of the Co(X)/noble metal multi-layers. In the embodiment shown in FIG. 2, the perpendicular magnetic recording material 19 comprises an initial nonmagnetic or paramagnetic 22 layer and a final perpendicular recording layer 25.

The initial paramagnetic material layer 22 preferably comprises a relatively very thin layer 28 of the Cobalt alloy, on the order of <1.5 Å. In this embodiment there are three such layers of the Cobalt alloy 28 which alternate with a palladium layer 31 which has a thickness on the order of about 1 nm. By the use of the relatively thin Cobalt alloy, the thickness is low enough such that the magnetic Curie temperature of the Cobalt alloy drops below room temperature, which renders this initial region paramagnetic. In this manner magnetic coupling between the layers 28 is prevented so as to increase the magnetic properties of the perpendicular recording media and to increase signal to noise ratio.

The final Cobalt alloy/noble recording metal multi-layers 25 are applied such that the individual Cobalt alloy layers 34 are about 2–6 Å thick, generally about 3 Å, and the noble metal layers 37 are approximately 8–15 Å in thickness. In this embodiment the magnetic recording material 25 is applied in a range of 8–20 layers and generally 15 layers. That is, after the initial paramagnetic layers 22 are applied, about 15 bilayers of the Cobalt alloy/noble metal are applied, the Cobalt alloy having at thickness of about 3 Å and the noble metal being a thickness of about 1 nm.

Depending upon the desired magnetic recording properties, the magnetic material layers 25 number between 8–20. This produces a low noise perpendicular magnetic recording medium having the desired magnetic properties, such as those shown in the polar MOKE loop of FIG. 3.

Figure 3:
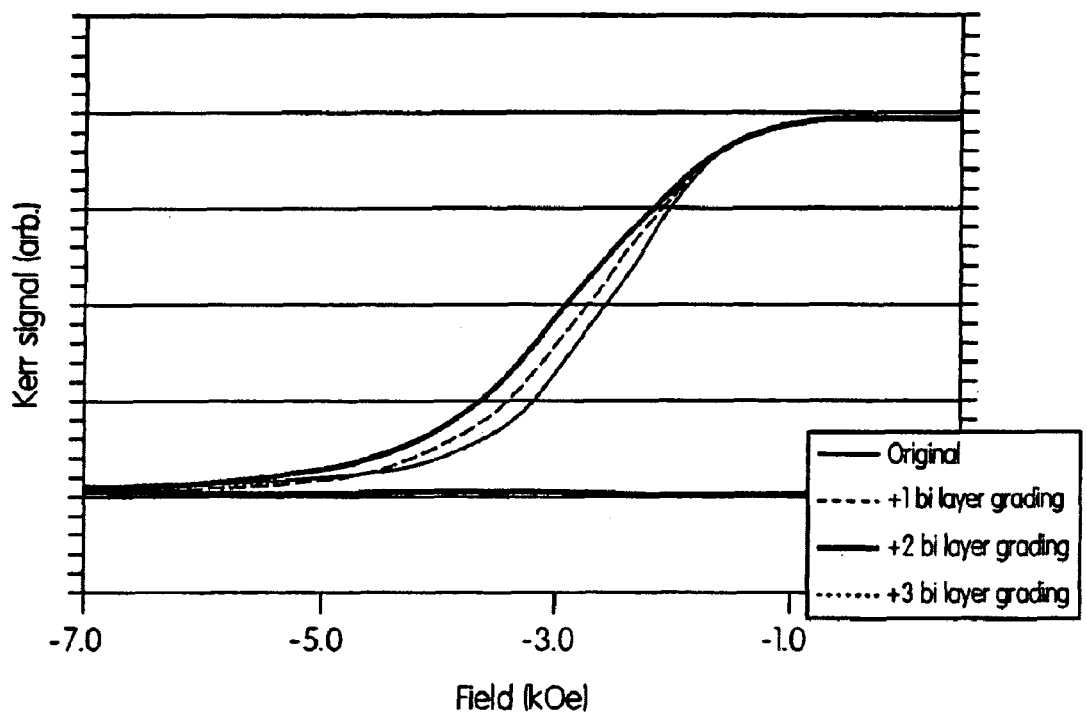
FIG. 3 is a graphical representation of a polar MOKE loop of the Cobalt alloy/noble metal multi-layer film produced according to the present invention.

By providing the initial paramagnetic layers 22, the layers are exchanged decoupled such that there is no magnetic coupling between neighboring grains of the Cobalt alloy. The grading of the initial growth region makes this initial film paramagnetic at room temperature. As shown in FIG. 3 the coercivity of the multilayer deposited with initial graded bilayers is enhanced. Furthermore as shown in the MOKE loop, as coercivity increases also the coercivity slope increases, indicating a higher degree of exchange decoupling.

While specific embodiments of the invention have been shown in the drawings and described in detail, it will be appreciated by those skilled in the art that various modifications and alterations would be developed in light of the overall teachings of the disclosure. Accordingly, the particular arrangements disclosed are meant to be illustrative only and not limiting as to the scope of the invention which is to be given the full breadth of the appended claims and in any and all equivalents thereof.

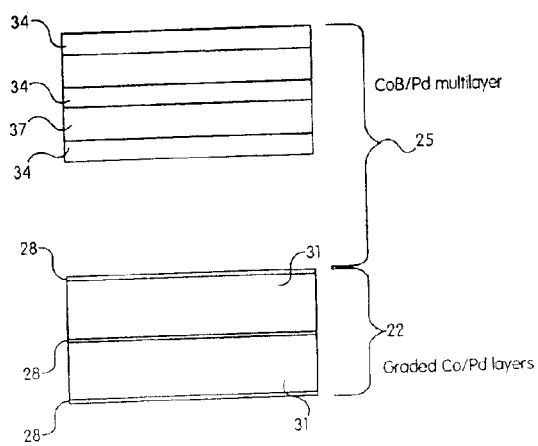

What is claimed is:

1. A magnetic recording medium having a substrate, a magnetic interlayer and a layer of magnetic recording material thereon, the magnetic recording material comprising an initial paramagnetic layer and a final recording layer, wherein the initial paramagnetic layer comprises a Cobalt alloy having a thickness of about 0.9 Å and a noble metal layer having a thickness of about 1 nm.

2. The magnetic recording medium as recited in claim 1, wherein the noble metal is palladium.

3. The magnetic recording medium as recited in claim 1, wherein the noble metal is platinum.

4. The magnetic recording medium as recited in claim 1, wherein the final recording layer comprises a second Cobalt alloy having a thickness of about 2–6 Å and a second noble metal layer having a thickness about 1 nm.

5. The magnetic recording medium as recited in claim 4, wherein the final recording layer is further comprised of a laminated structure such that the final recording layer includes about 8–20 alternating layers of the second Cobalt alloy and the second noble metal.

6. The magnetic recording medium as recited in claim 5, wherein the final recording layer comprises 15 alternating layers of the second Cobalt alloy and the second noble metal.

7. The magnetic recording medium as recited in claim 1, wherein the initial paramagnetic layer is further comprised of a laminated structure such the initial paramagnetic layer includes about 1–3 alternating layers of the Cobalt alloy and the noble metal.

8. The magnetic recording medium as recited in claim 1, wherein the Cobalt alloy is comprised of Cobalt and one or more of the group consisting of boron, chromium, tantalum, francium, platinum, tungsten, manganese, molybdenum, ruthenium, silicon, nickel, copper, or gold.

9. The magnetic recording medium as recited in claim 1, wherein the Cobalt alloy is comprised of $CoCr_{40}$.

10. A magnetic recording medium comprising:
    a. a substrate;
    b. a soft magnetic underlayer;
    c. an initial paramagnetic layer having 1–3 layers of a Cobalt alloy, each layer being about 0.9 Å in thickness; and
    d. a perpendicular recording material including alternating layers of a Cobalt Alloy and a noble metal.

11. A magnetic recording medium as recited in claim 10, wherein
    b. the perpendicular recording material has 8–20 layers of the Cobalt alloy, each Cobalt alloy layer having a thickness of about 2–6 Å and each noble metal layer having a thickness of about 1 nm.

12. A magnetic recording medium as recited in claim 11, wherein the Cobalt alloy is further comprised of $CoCr_{40}$.

13. A magnetic recording medium as recited in claim 11, wherein the Cobalt alloy is further comprised of Cobalt and boron, chromium, tantalum, francium, platinum, tungsten, manganese, molybdenum, ruthenium, silicon, nickel, copper, or gold.

14. A magnetic medium as recited in claim 12 or 13, wherein the noble metal is palladium.

15. A magnetic recording medium as recited in claim 12 or 13, wherein the noble metal is palladium.

16. A magnetic recording medium having a substrate, a magnetic interlayer and a layer of magnetic recording material thereon, the magnetic recording material comprising a paramagnetic Cobalt alloy of less than 1.5 Å and a final recording layer of about 2–6 Å in thickness.

17. A magnetic recording medium as recited in claim 16, wherein the paramagnetic Cobalt alloy is about 0.9 Å in thickness.

18. A magnetic recording medium as recited in claim 16, wherein the final recording layer is further comprised of alternating layers of a second Cobalt alloy and a noble metal.

19. A magnetic recording medium as recited in claim 18, wherein the second Cobalt alloy layers are each approximately 2–6 Å and the noble metal layers are each about 8–15 Å thick.

20. A magnetic recording medium as recited in claim 19, wherein each second Cobalt alloy layer is about 3 Å thick and each noble metal layer is about 1 Å in thickness.

21. A magnetic recording medium as recited in claim 20, wherein the noble metal is palladium.

22. A magnetic recording medium having a substrate, a magnetic interlayer and a layer of magnetic recording material thereon, the magnetic recording material comprising an initial paramagnetic layer and a final recording layer, wherein the initial paramagnetic layer comprises a Cobalt alloy having a thickness of less than 1.5 Å and a noble metal layer having a thickness of about 1 nm.

23. A magnetic recording medium, comprising:
   a. an initial paramagnetic material layer comprising alternating layers of Cobalt alloy and noble metal, wherein the Cobalt alloy layers are less that 1.5 angstroms; and
   b. a final recording multilayer comprising alternating layers of Cobalt alloy and noble metal, wherein the Cobalt alloy layers of the final recording multilayer are thicker than the Cobalt alloy layers of the initial paramagnetic layer such that there is no magnetic coupling between the neighboring grains of the Cobalt layers of the initial paramagnetic material layer.

24. The magnetic recording medium of claim 23, wherein the noble metal layers of the initial paramagnetic layers are about 1 nm.

25. The magnetic recording medium of claim 23, wherein the Cobalt alloy layers of the final recording multilayer are about 3 angstroms.

26. The magnetic recording medium of claim 23, wherein the noble metal layers of the final recording multilayer are between approximately 8 angstroms and approximately 15 angstroms in thickness.

* * * * *

UNITED STATES PATENT AND TRADEMARK OFFICE
CERTIFICATE OF CORRECTION

PATENT NO. : 6,955,857 B2
DATED : October 18, 2005
INVENTOR(S) : Yukiko Kubota, Dieter Weller and Mei-Ling Wu It is certified that error appears in the above-identified patent and that said Letters Patent is hereby corrected as shown below:

Drawing sheets 1 of 2 and 2 of 2 should be replaced with attached.

<u>Column 4,</u>
Line 44, after "magnetic", insert -- recording --.
Line 47, change "palladium" to -- platinum --.

Signed and Sealed this

Fourteenth Day of February, 2006

JON W. DUDAS
*Director of the United States Patent and Trademark Office*

(12) United States Patent
Kubota et al.

(10) Patent No.: US 6,955,857 B2
(45) Date of Patent: Oct. 18, 2005

(54) EXCHANGE DECOUPLED COBALT/NOBLE METAL PERPENDICULAR RECORDING MEDIA

(75) Inventors: Yukiko Kubota, Pittsburgh, PA (US); Dieter Weller, Gibsonia, PA (US); Mei-Ling Wu, Cranberry Township, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 98 days.

(21) Appl. No.: 10/032,721

(22) Filed: Dec. 27, 2001

(65) Prior Publication Data

US 2002/0086184 A1 Jul. 4, 2002

Related U.S. Application Data

(60) Provisional application No. 60/258,790, filed on Dec. 29, 2000.

(51) Int. Cl.$^7$ ............................................... G11B 5/673
(52) U.S. Cl. ........................... 428/694 TS; 428/694 TM
(58) Field of Search .................. 428/694 TS, 694 TM, 428/611, 669, 670, 678, 215, 336

(56) References Cited

U.S. PATENT DOCUMENTS

| | | | |
|---|---|---|---|
| 4,103,315 A | | 7/1978 | Hempstead et al. |
| 4,210,946 A | | 7/1980 | Iwasaki et al. |
| 5,051,288 A | | 9/1991 | Ahlert et al. |
| 5,587,235 A | * | 12/1996 | Suzuki et al. ............... 428/332 |
| 5,604,030 A | * | 2/1997 | Yamane et al. ............. 428/332 |
| 5,726,838 A | * | 3/1998 | Soeya et al. ............. 360/327.32 |
| 5,750,270 A | * | 5/1998 | Tang et al. ................. 428/611 |
| 5,834,085 A | | 11/1998 | Lairson et al. |
| 6,139,950 A | | 10/2000 | Wu et al. |
| 6,156,422 A | | 12/2000 | Wu et al. |
| 6,207,269 B1 | | 3/2001 | Wu et al. |
| 6,212,047 B1 | | 4/2001 | Payne et al. |
| 6,218,003 B1 | | 4/2001 | Wu et al. |
| 6,221,481 B1 | | 4/2001 | Wu et al. |
| 6,238,780 B1 | | 5/2001 | Wu et al. |
| 6,238,809 B1 | | 5/2001 | Wu et al. |
| 6,280,813 B1 | | 8/2001 | Carey et al. |
| 6,468,670 B1 | * | 10/2002 | Ikeda et al. ................. 428/611 |
| 2001/0051287 A1 | * | 12/2001 | Kikitsu et al. ......... 428/694 ML |
| 2002/0192506 A1 | * | 12/2002 | Coffey et al. ......... 428/694 TM |

OTHER PUBLICATIONS

L. Wu et al., "Medium noise properties of Co/Pd multilayer films for perpendicular magnetic recording", *Journal of Magnetism and Magnetic Materials 193*; (1999) pp. 89–92; Publisher—Elsevier; JAPAN.

Y. Ochiai et al.; "Co/Pt and Co/Pd Ultrathin Multilayered Films as New Magneto-Optical Recording Materials"; *IEEE Transactions on Magnetics*, vol. 25, No. 5. p. 3755–3757; Sep. 1989; JAPAN.

P.F. Carcia; "Perpendicular magnetic anisotropy in Pd/Co and Pt/Co thin-film layered structures" *Journal of Applied Physics*, vol. 63, No. 10, p. 5066–5073, May 15, 1988; American Institute of Physics.

Takano et al.; "$Co_{1-x}Cr_x$/Pt multilayers as perpendicular recording media" *Journal of Applied Physics*, vol. 87, No. 9, p. 6364–6366, May 1, 2000, American Institute of Physics.

* cited by examiner

*Primary Examiner*—Kevin M. Bernatz
(74) *Attorney, Agent, or Firm*—Buchanan Ingersoll PC; Dennis M. Carleton

(57) ABSTRACT

A magnetic recording medium of the perpendicular type, for a disc drive. The magnetic recording material includes a Cobalt alloy layer interspersed with a noble metal layer. The initial graded material is paramagnetic to increase to the magnetic properties of perpendicular recording media into increase the signal to noise ratio. The final recording layer has 8–20 alternating multilayer of the Cobalt alloy and a noble metal.

26 Claims, 2 Drawing Sheets